July 14, 1936.  H. W. VAHLTEICH ET AL  2,047,530
MARGARINE AND OIL FOR USE THEREIN
Filed April 7, 1934

INVENTORS.
HANS W. VAHLTEICH
CARL H. HAURAND
RALPH H. NEAL
BY Paul R. Ames
ATTORNEY.

Patented July 14, 1936

2,047,530

UNITED STATES PATENT OFFICE 2,047,530

MARGARINE AND OIL FOR USE THEREIN

Hans W. Vahlteich, New York, N. Y., Carl H. Haurand, North Plainfield, and Ralph H. Neal, Bayonne, N. J., assignors to The Best Foods, Inc., New York, N. Y., a corporation of Delaware Application April 7, 1934, Serial No. 719,514

17 Claims. (Cl. 99—118)

This invention relates to the production of margarine or butter substitutes and more particularly to the preparation of an oil to be used therein.

In the preparation of butter substitutes from vegetable oils, it is desired to obtain physical characteristics and taste characteristics as similar to high grade natural butter as is possible. It is particularly important that the consistency and physical state of the product at ice box temperatures and at ordinary room temperatures be such that the product will "stand up" and cut properly and at the same time that the melting point and rapidity of softening upon being placed in the mouth be such as to free the milk from the emulsion and give the proper taste sensation. These characteristics in the finished product are greatly affected by the melting point and setting point relationship of the oil or fat used as the base for the butter substitute.

It is an object of the present invention to provide a selectively hydrogenated vegetable oil, such as cotton seed oil or mixtures of cotton seed oil with other oils or fats, of improved characteristics for use in preparing butter substitutes or margarine. Another object is to provide an oil having a melting point-setting point relationship particularly adapted to provide improved characteristics in the finished butter substitute. A further object is to provide a butter substitute of improved characteristics. Other objects will become apparent.

Normal cotton seed oil is composed mainly of glycerides of the double bonded unsaturated fatty acid, linoleic acid, the single bonded unsaturated fatty acid, oleic acid and saturated acids such as palmitic acid and stearic acid. (See "Vegetable fats and oils" by G. S. Jamieson (1932) p. 196.) Linoleic and oleic acid glycerides are normally liquid at room temperature, while the glycerides of the saturated acids referred to are solid.

We have found that by hydrogenating the cotton seed oil in such a manner as to produce as great a reduction as possible in the proportion of glycerides of linoelic acid, with the formation of relatively large quantities of glycerides of iso-oleic acid and relatively small quantities of glycerides of saturated acids, an oil having greatly improved characteristics for use in butter substitutes may be prepared.

Figure 1:
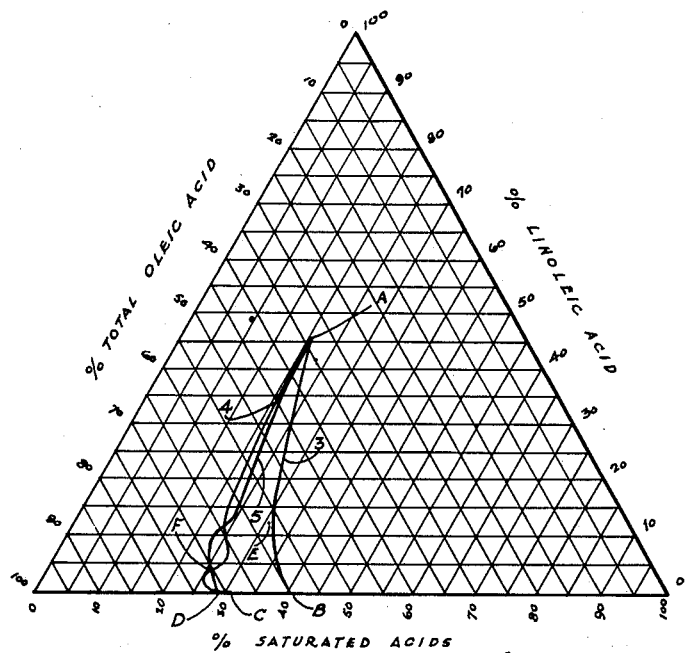
Figure 2:
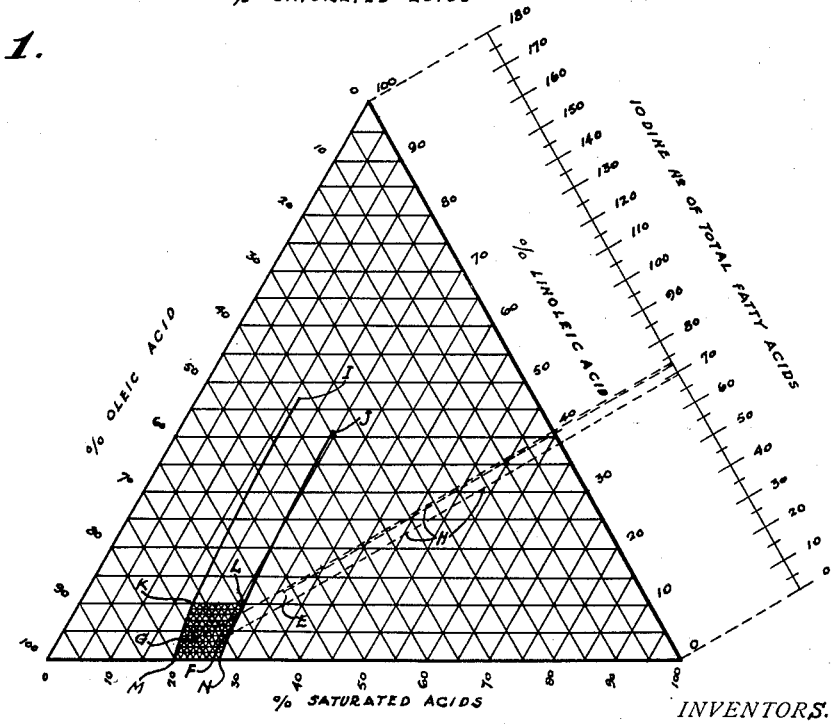

In describing the preparation of our improved oil, reference will be made to the drawing in which Figure 1 is a three dimensional chart illustrating the changes in composition of a cotton seed oil hydrogenated under different conditions and Figure 2 is a similar chart illustrating the zone of our preferred operations. The values given illustrate the percentages by weight of saturated acids, linoleic acid and the difference from 100% as oleic acid, derived from the oil before, during and after the hydrogenation, it being understood that the fatty acids referred to are present in the oil mainly as glycerides. The oleic acid recorded also includes the iso-oleic acid formed during the hydrogenation.

In Figure 1 the point A represents the initial composition of a cotton seed oil giving, upon analysis 45.5% linoleic acid, 20.5% saturated acids and 34.0% oleic acid. The line 3 represents the change in composition of the oil during a hydrogenation to the composition designated at point B. This line illustrates the path of a normal hydrogenation in the preparation of an oil for use in baker's shortening. Lines 4 and 5 illustrate the changes in composition of the same oil from its initial composition A to the final compositions C and D when hydrogenated so as to give the oil we find especially suitable for use in preparing margarine. It will be observed that there is a wide and appreciable difference in the composition of the oils or fats suitable for shortening, as compared with our preferred type of margarine oil, at practically all stages of the hydrogenations.

An analytical determination of the composition of a hydrogenated cotton seed oil suitable for shortening gave the following results:

Percent by weight

Melting point 109.4° F.—Saturated fatty acids _____ 31.0
Setting point 78.6° F.—Linoleic acid _____ 12.1
Iodine No. 69.7—Total oleic acids _____ 56.9
              Iso-oleic acid _____ 14.0

This oil is indicated by the point E on the charts.

An analytical determination of the composition of a hydrogenated cotton seed oil of the type of our improved margarine oil gave the following results:

Percent by weight

Melting point 95.4° F.—Saturated fatty acids _____ 26.1
Setting point 76.7° F.—Linoleic acid _____ 3.8
Iodine No. 66.8—Total oleic acids _____ 70.1
              Iso-oleic acid _____ 20.2

This oil is indicated by the point F on the charts.

The melting point and other characteristics of a margarine oil should be varied according to the climatic conditions in which the product is to be used. The margarine oil referred to above is one suitable for a summer oil and the following is an analytical determination of a hydrogenated cotton seed oil of our improved type and suitable for a winter margarine oil:

|  | Percent by weight |
|---|---|
| Melting point 90.0° F.—Saturated fatty acids | 21.0 |
| Setting point 71.6° F.—Linoleic acid | 3.1 |
| Iodine No. 70.5—Total oleic acids | 75.9 |
| Iso-oleic acid | 16.6 |

This oil is represented by the point G on the chart shown as Figure 2.

The percentages of acids referred to herein are obtained from the total solid fatty acids, determined by the method given in the paragraph entitled "Determination of solid fatty acids" starting on page 362 of the Jamieson reference referred to above, and from the iodine numbers of the oil and of the total solid fatty acids so separated. The method described by Jamieson gives the percentage of total solid fatty acids based upon the sample of oil tested. For cotton seed oil this value may be expressed on the basis of total fatty acids equal 100%, by dividing the percentage of total solid fatty acids in the oil by .954, which is the conversion factor ordinarily used in converting total fatty acids of cotton seed oil to the glycerides thereof or to the oil itself. The iodine numbers are determined by the Wijs method, using a one hour reaction period, which is the official method of the Association of Official Agricultural Chemists. The percentage of iso-oleic acid is equal to the iodine number of the total solid fatty acids, determined as described above, multiplied by the percentage of total solid fatty acids in the oil (expressed on the basis of total fatty acids equal 100%), divided by 90.

The percentage of saturated fatty acids is equal to the percentage of total solid fatty acids minus the percentage of iso-oleic acid.

The percentage of total unsaturated fatty acids is equal to 100 minus the percentage of saturated fatty acids. The iodine number of the total fatty acids is calculated as the iodine number of the oil divided by 0.954. That number, divided by the percentage of unsaturated fatty acids, multiplied by 100, gives the iodine number of the unsaturated fatty acids.

The percentage of linoleic acid is determined by multiplying the iodine number of the total unsaturated fatty acid minus 90 by the percentage of total unsaturated fatty acids and dividing by 91.

The percentage of total oleic acids is the difference between 100 and the sum of the percentages of saturated fatty acids and linoleic acid.

The melting points referred to herein are determined by the Wiley method, which is the melting point determination method of the Association of Official Agricultural Chemists. The setting points are determined as follows:

The following apparatus is used:

(a) 800 cc. beaker for water bath at 15° C.

(b) 4 oz. wide-mouth bottle set inside (a) to serve as air bath for test tube (d).

(c) Cork for (b) bored for 1" diameter test tube.

(d) Test tube 6" x 1" fitted with cork bored for thermometer and notched for stirring rod.

(e) Titer thermometer inserted in test tube (d) through cork.

(f) Stirring rod 5 mm. diameter bent with horizontal loop at end to surround the lower end of the thermometer (e) and fit between it and the walls of the test tube (d).

(g) Any convenient cup for a 10° C. water bath.

Pour enough of the oil being tested into the test tube to bring it to a level of 3" at room temperature. Adjust the thermometer and stirring rod in the tube, and heat the test tube to bring the temperature of the oil to 50° C. Set the test tube in the 10° C. water bath and agitate the oil by a rapid vertical motion (about 250 strokes per minute) of the stirring rod until the temperature drops to 35° C. Then lift the tube from the bath and agitate the oil while the tube is held in the air until the temperature reaches 30° C. and then replace the tube in a 10° C. bath until the temperature drops to 25° C. Quickly dry the tube and transfer to the air jacket which is immersed in a water bath maintained at 15° C. Continue slow and uniform agitation until the temperature ceases to fall and comes to rest. Raise the thermometer so that the center of the bulb is 1½" from the bottom of the tube and raise the stirring rod out of the oil. Read the thermometer at frequent time intervals and record the maximum temperature attained before the temperature starts falling again, as the setting point.

In Figure 2 we have illustrated a preferred zone of operation to produce our improved margarine oil. In this figure we have superimposed a scale of iodine numbers of the total fatty acids in an oil of any particular composition illustrated on the three dimensional chart. These values may be converted to iodine numbers of the oils containing glycerides of fatty acids corresponding to the percentages of fatty acids indicated by any point on the chart by multiplying the iodine number of the total fatty acids, as given on the chart, by 0.954. The dotted lines H illustrate the determination of the iodine numbers of the total fatty acids for particular oils illustrated by the points E, F and G. The iodine number of the total fatty acids of any other oil may be determined by drawing a line parallel to the lines H from the point indicating the composition of such oil.

Cotton seed oils normally have compositions within the range illustrated by the compositions I and J, which are oils selected at about the limits of the compositions usually found. I has a composition corresponding to 16% saturated acids, 47% linoleic acid and the remainder (37%) oleic acid. J has a composition corresponding to 24% saturated acids, 41% linoleic acid and the remainder (35%) oleic acid.

In preparing our improved margarine oil, the cotton seed oil is hydrogenated in such a manner as to convert the glycerides of linoleic acid to glycerides of oleic acid and glycerides of iso-oleic acid with the minimum increase in glyceries of saturated acids. This may be accomplished by a proper selection of catalysts, temperatures and times, preferably a relatively high temperature and with an active catalyst. The following is an example of a procedure by which the oil may be hydrogenated to give our desired results: The catalyst may be prepared by putting diatomaceous earth or similar material into a nickel sulphate solution, adding caustic soda in stoichiometric proportions to precipitate the nickel as nickel hydroxide and elevating the temperature to finally boil the solution. The solution is then filtered and washed to free the precipitate of sulphates and sodium hydroxide. It is then dried and pulverized. The pulverized material is then fed through a reducing oven in a stream countercurrent to a stream of hydrogen, in which it is maintained at about 850 to 1050° F. for about 15 to 30 minutes. The reduced nickel oxide is mixed, before possible contact with air, with an oil preferably cotton seed oil, although other suitable vegetable, animal or fish oils may be used as the vehicle for the catalyst. A small quantity of the catalyst should be tested to determine its activity.

The oil to be reduced is heated to about 250 to 300° F. and about .05 to .5% by weight of the active nickel catalyst (calculated as metallic nickel to oil to be hydrogenated) is then added to the oil. Hydrogen gas is then passed into the vessel at a convenient pressure, for instance, 20 to 100 pounds per square inch, the oil being vigorously and thoroughly agitated throughout the reaction. Since the reaction is exothermic, it may be necessary to prevent an increase in temperatures such as would injure the oil by employing a cooling medium to absorb the excessive heat. In practice we have found it desirable to keep the temperature of the oil below about 400° F. The hydrogen may be introduced at the rate of about 200 cu. ft. per minute for a 10,000 pound batch, although both the pressure of the hydrogen and its rate of introduction may be rather widely varied with successful results.

The end point of the hydrogenation is conveniently determined by melting point, setting point and iodine number determinations. The melting point of the oil should be brought to about 85 to 97, preferably 90 to 95° F., and the setting point to about 72 to 79° F., care being taken to maintain the setting point as close to the melting point as can be done. The iodine number of the oil should be reduced to about 62 to 75.

The hydrogenated oil selected for the production of the margarine should be one in which the glycerides correspond to the fatty acids within the range defined by the lines K, L, N, M. This range of fatty acids is as follows: Saturated acids 18 to 27%, preferably 18 to 25%, linoleic acid 0 to 10%, preferably 0 to 5% and oleic acid (oleic and iso-oleic acids) difference from 100%. As indicated above, the proportion of glycerides of iso-oleic acid in the hydrogenated oil is important. In our improved margarine oil, the glycerides should be present in such quantities as to correspond to about 10 to 20%, preferably 15 to 20% iso-oleic acid. The iodine number of the total fatty acids in the oil should be about 65 to 82, preferably 65 to 73.

The procedure given above for preparing the catalyst is given merely as an illustration and may be modified in many respects in producing an oil of the characteristics we have found to give the improved results referred to above and defined by the zone KLNM of the chart and the melting point-setting point and iodine number relationship given. Other metallic compounds may be used in preparing the catalyst. Other temperatures and details of reduction of the catalyst and reduction of the oil may also be followed, the important point being to provide an oil of the characteristics described above.

The oil described above, after the customary treatment such as refining, bleaching and deodorizing, may be used in the usual manner to produce the margarine. For example, it may be agitated together with cultured milk in the conventional manner at suitable temperatures, the proportions of oil and milk depending upon such factors as the flavor of the culture and the flavor desired in the product. For instance, 4 parts of oil may be agitated with 1 part of milk. The mixture may then be chilled in any well known manner and the chilled mixture may be kneaded, worked with salt and packaged, as usual.

The finished product will have improved characteristics more like those of high grade natural animal butter than the butter substitutes previously made. In some respects the product is even superior to natural butter in its physical characteristics. For example, it has a higher range of spreadability than such butter substitutes or even than butter. It will spread readily at 45° F. and at 40° F. or lower it will spread better than natural butter at the same temperature. It also will maintain its form better at higher temperatures. For example, it will soften less than butter at 80° F. At average room temperatures (65 to 75° F.) it is very similar to butter in its physical characteristics. Thus our product is usable throughout a greater range of temperatures than other butter substitutes or even than natural buter and at the same time it is not chewy or waxy in the mouth, will melt quickly in the mouth to release the milk and give a pleasant flavor sensation.

If desired, small quantities of oils other than cotton seed oil may be used with the cotton seed oil. For example, an oil such as peanut oil or corn oil, which is low in glycerides of saturated acids, may be used, for example, in the proportions of 2 to 20% by weight of the combined oils. This added oil may be mixed with the cotton seed oil and hydrogenated with it or the oils may be hydrogenated separately and then mixed.

The terms used in describing the invention have been used in their descriptive sense and not as terms of limitation, it being intended that all equivalents of the terms used be included within the scope of the appended claims.

What we claim is:

1. A margarine oil comprising a hydrogenated cotton seed oil having glycerides corresponding to 18 to 25% saturated fatty acids, less than 5% linoleic acid and substantially the remainder of the glycerides of fatty acids being of oleic acid, said oil having a melting point of about 90 to 95° F., a setting point of about 72 to 79° F., the iodine number of the fatty acids corresponding to the glycerides in the oil being about 65 to 73.

2. A butter substitute comprising a cultured milk and an oil having glycerides of fatty acids corresponding to 18 to 27% saturated fatty acids, 0 to 10% linoleic acid and substantially the remainder of the glycerides of fatty acids being of oleic acids, in which the oleic acids include iso-oleic acid in the proportion of 10 to 20% of the total fatty acids.

3. A butter substitute comprising a cultured milk and a hydrogenated cotton seed oil having glycerides corresponding to 18 to 25% saturated fatty acids, 0 to 5% linoleic acid, 15 to 20% iso-oleic acid and substantially the remainder of the glycerides of fatty acids being of oleic acid.

4. A butter substitute as defined in claim 3 in which the oil has a melting point of 90 to 95° F., a setting point of 72 to 79° F. and an iodine number of 62 to 75.

5. A margarine oil comprising a hydrogenated cotton seed oil having a melting point of about 95 to 96° F. and a setting point of about 76 to 78° F.

6. A margarine oil as defined in claim 5, including about 16 to 20% glycerides of iso-oleic acid and about 0 to 5% of linoleic acid.

7. A butter substitute comprising a cultured milk and a hydrogenated cotton seed oil having a melting point of about 95 to 96° F. and a setting point of about 76 to 78° F.

8. A butter substitute as defined in claim 7 in which the oil contains about 16 to 20% of iso-oleic acid and about 0 to 5% linoleic acid.

9. An oil suitable for use as a margarine oil comprising vegetable oil having glycerides of fatty acids corresponding to about 18 to 27% saturated fatty acids, 0 to 10% linoleic acid, over 10% iso-oleic acid and the remainder of the glycerides of fatty acid consisting mainly of oleic acid.

10. An oil as defined in claim 9 in which the glycerides of linoleic acid are less than 5%.

11. An oil as defined in claim 9 in which the glycerides of linoleic acid are less than 5% and the glycerides of iso-oleic acid are about 16 to 20%.

12. An oil as defined in claim 9 having a melting point of about 85 to 97° F., a setting point of about 72 to 79° F. and an iodine number of about 65 to 73.

13. An oil as defined in claim 9 having a melting point of about 94 to 96° F. and a setting point of about 76 to 78° F.

14. A butter substitute comprising a cultured milk and a vegetable oil having glycerides of fatty acids corresponding to about 18 to 27% saturated fatty acids, 0 to 10% linoleic acid, over 10% iso-oleic acid and the remainder of the glycerides of fatty acid consisting mainly of oleic acid.

15. A butter substitute as defined in claim 14 in which the vegetable oil contains glycerides of linoleic acid in the proportion of less than 5%.

16. A butter substitute as defined in claim 14 in which the vegetable oil has a melting point of about 85 to 97° F., a setting point of about 72 to 79° F. and an iodine number of about 65 to 73.

17. A butter substitute as defined in claim 14 in which the vegetable oil has a melting point of about 94 to 96° F. and a setting point of about 76 to 78° F.

HANS W. VAHLTEICH.
CARL H. HAURAND.
RALPH H. NEAL.